Figure 1:
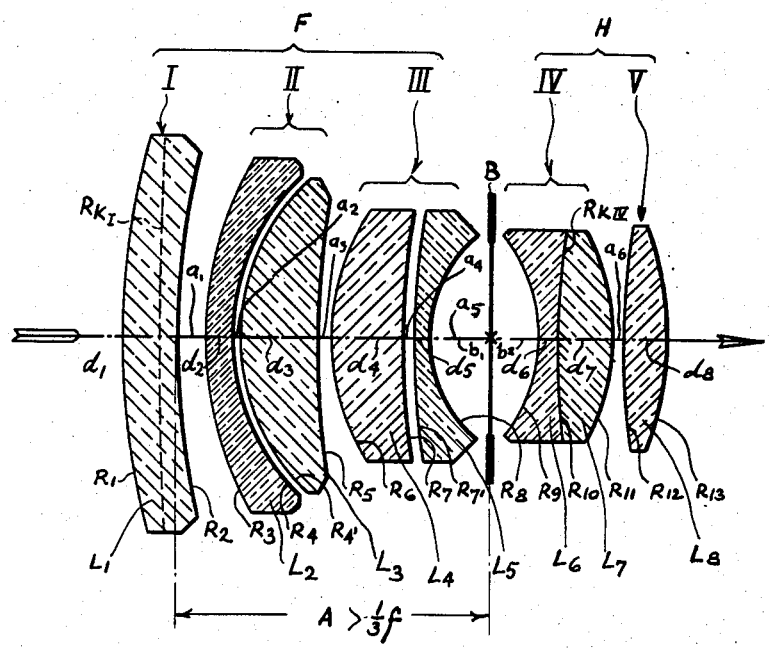

Dec. 15, 1953   A. W. TRONNIER   2,662,447
MODIFIED GAUSS-TYPE HIGH-SPEED PHOTOGRAPHIC
OBJECTIVE WITH ANASTIGMATIC FLATTENED FIELD
Filed Jan. 25, 1952

INVENTOR.
ALBRECHT WILHELM TRONNIER
BY Mock - Blum
ATTORNEYS

Patented Dec. 15, 1953

2,662,447

UNITED STATES PATENT OFFICE 2,662,447

MODIFIED GAUSS-TYPE HIGH-SPEED PHOTOGRAPHIC OBJECTIVE WITH ANASTIGMATIC FLATTENED FIELD

Albrecht Wilhelm Tronnier, Gottingen, Germany, assignor to Voigtlander, A. G., Braunschweig, Germany, a corporation of Germany Application January 25, 1952, Serial No. 268,308

Claims priority, application Germany June 21, 1951

3 Claims. (Cl. 88—57)

This invention relates to a photographic objective of high light-transmitting capacity and anastigmatic flatness of the image field and has particular relation to an objective of the modified Gauss type, in which two lens systems are arranged on opposite sides of a centrally located diaphragm.

The main object of the present invention is to provide a photographic objective of the above mentioned type, in which the lens system, or half objective, arranged on the side of the major conjugate, has a new structure of the type described hereinafter, in order to improve the performance of the objective.

Other objects and the advantages of the invention will be apparent from the appended claims and drawings and the following specification which describes by way of example, and without limitation, some embodiments of the invention.

In the objectives according to the present invention, the front half arranged on the side of the longer conjugate is turned toward the object, in the meaning of taking the picture, and forms a specific variation of an enlarged half objective of the Gauss type, while the rear group arranged on the other side of the diaphragm, has the conventional design of a half objective of the Gauss type.

The objectives embodying the present invention have high light-transmitting capacity; their relative aperture is in the range of about 1:2 and 1:1 and they have a new structure resulting in substantial improvement of the photographic performance. In this new structure, the half objective arranged on the side of the major conjugate, contains a meniscus-shaped front lens (I) which is concave relative to the diaphragm, and this lens (I) is followed by two lens pairs (II) and (III), each of these pairs being composed of meniscus-shaped individual lenses which are all likewise concave relative to the diaphragm and are of opposite power in each pair.

In this new objective, the specific design of the meniscus-shaped front lens (I), which limits the objective on the side of the major conjugate and is conjugate relative to the diaphragm, can be considerably adapted within the scope of the invention, to technical requirements depending on the intended use of the objective.

For example, a front lens (I) of distinctly positive refractive effect is used in the system according to the invention, if the objective is used in an oscillograph camera for registration of screen images of a Braun tube or the like. In taking such pictures an increased convergence of the rays in the object space is advisable and converging effect of the lens limiting the system on the side of the major conjugate, is of particular advantage.

According to another embodiment of the invention, said front lens (I) has a negative refractive effect. This embodiment is always used when it is of advantage for the total system to influence location of the principal point in such manner that it is shifted toward the minor conjugate in the direction of light. This is particularly indicated in objectives of very high light-transmitting capacity, which, in view of this structure, have a longer intersectional width on the image side, and, therefore, can be built in with particular advantage in cameras, in which rotating diaphragms or reflex mirrors or the like, are arranged between the rear lens and the light-sensitive film.

Investigations in connection with the present invention have shown that the effects resulting from such influence on the location of the principal point are the stronger, the longer the distance between said front lens (I) and the diaphragm is. Therefore, for securing these effects, said front lens element (I) is arranged relative to the centrally arranged diaphragm in a distance which is distinctly longer than $\frac{1}{3}$ of the equivalent focal length of the total objective.

In order to avoid excessive length, in practice A should not exceed about $\frac{5}{8}$ of the equivalent focal length.

If a system according to the invention is used with full aperture and, therefore, contains no diaphragm member, the center of the free diaphragm space has to be considered as the point of location of the diaphragm and serves for determining said distance, within which lens pairs (II) and (III) of the front half of the objective, are also arranged.

In said front half of the objective, lens member (I) is located at the point of largest cross-section of the rays. Therefore, in order to obtain relatively low surface curvatures, the glass of lens (I) should have a medium or high refractive range $(n_1)$, preferably in such manner that the mean refractive number of lens element (I) is higher than the refractive number $(n_5)$, for the same color, of the glass of the lens, which limits the front half of the objective on the diaphragm side, and is denoted by reference numeral $L_5$.

Application of this feature according to the invention is particularly indicated in objectives having large relative apertures. According to a modified embodiment of the invention, meniscus-shaped lens element (I), which limits the front half of the objective on the side of the major conjugate, is composed of two individual lenses cemented together along the surface shown in dotted line and denoted $R_{K_I}$ in Figure 1. In accordance with specific requirements, this cemented member can be provided with spherical or chromatic partial correction or with a simultaneous combination of several partial corrections, as the objectives embodying the present invention are capable of considerable variation of construction and adaptation to specific applications.

Figure 2:
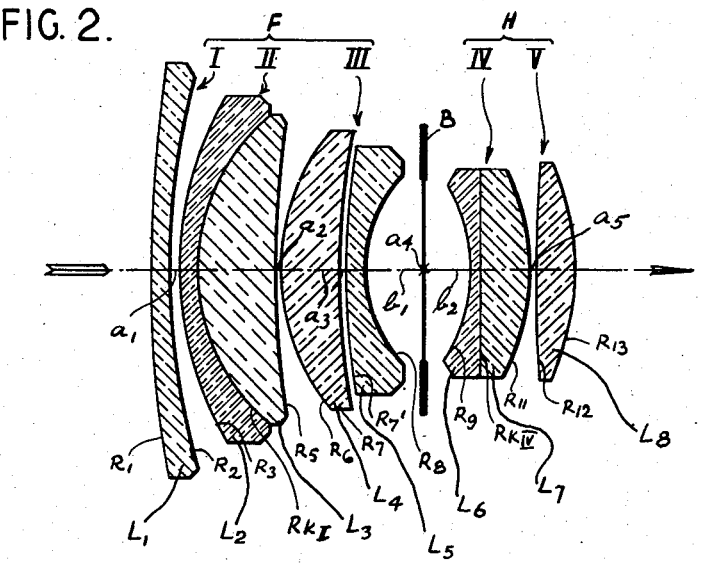

In the appended drawings, Figure 1 diagrammatically illustrates the objective type embodying the present invention, while Figure 2 illustrates, in combination with the table following further below, an example of the invention for f=100 mm.

The three lens components arranged on the side of the major conjugates are denoted by reference symbols I, II and III, and the assembly of these elements, forming the front half of the objective is denoted F. The diaphragm is denoted by reference symbol B and the objective parts forming the rear half of the objective, which is denoted H, are denoted by reference symbols IV and V.

In the above mentioned modified embodiment of the invention, $R_{K_I}$ is a cemented surface, by which two individual lenses are cemented together in the manner indicated in Figure 1, for obtaining partial corrections adapted to the intended specific application of the objective. In a similar manner, two lenses may be cemented together by cemented surface $R_{K_{IV}}$, as likewise shown in Figure 1. Reference symbol A denotes the distance between front lens I, measured from vertex of the inner lens surface having radius of curvature $R_2$, along the optical axis, and diaphragm B.

The individual lenses of the objective shown in the drawing are denoted, in consecutive order, by reference symbols $L_1$, $L_2$ ... $L_8$; the radii of curvature by reference symbols $R_1$, $R_2$ ... $R_{13}$; the thickness of lenses $L_1$ to $L_8$ by reference symbols $d_1$, $d_2$ ... $d_8$.

In Figure 2, the distances of lenses separated by air spaces, are denoted $a_1$, $a_2$, $a_3$, $a_4$, and $a_5$, the diaphragm space being divided into $b_1$, on the side of the object, and $b_2$, on the side of the image.

The above reference numerals are used also in the following table, in which the glasses of lenses $L_1$ to $L_8$ are characterized by the mean refractive number ($n_d$) for yellow helium light, figures $n_1$ to $n_8$ corresponding to lenses $L_1$ to $L_8$, while the mean color dispersion is characterized by their Abbe numbers $\nu_1$ to $\nu_8$. The paraxial intersectional width of the objective, determining the length of the shorter conjugate, for objects at infinite distance, referred to rays near the axis, is denoted $p_0'$.

Example

[f=100   1:1.5   $p_0'$=66.602]

| | | | | |
|---|---|---|---|---|
| $R_1$=163.48 | $d_1$=3.74 | | $n_1$=1.61959 | $\nu_1$=60.5 |
| $R_2$=+143.31 | $a_1$=1.87 | | air | |
| $R_3$=+66.50 | $d_2$=3.44 | | $n_2$=1.72713 | $\nu_2$=28.4 |
| $R_4 = R_4' = R_{K_{II}}$=+41.41 | $d_3$=15.74 | | $n_3$=1.61966 | $\nu_3$=55.0 |
| $R_5$=+196.91 | $a_2$=0.28 | | air | |
| $R_6$=+41.41 | $d_4$=11.79 | | $n_4$=1.70329 | $\nu_4$=41.1 |
| $R_7$=+159.87 | $a_3$=1.55 | | air | |
| $R_7'$=+196.91 | $d_5$=3.35 | | $n_5$=1.54826 | $\nu_5$=45.8 |
| $R_8$=+25.02 | | $b_1$=11.45 | | |
| | $a_4$=20.71 | $b_2$=9.26 | diaphragm space | |
| $R_9$=−30.09 | $d_6$=2.00 | | $n_6$=1.64819 | $\nu_6$=33.7 |
| $R_{10} = R_{10}' = R_{K_{IV}}$=infinite | $d_7$=10.31 | | $n_7$=1.61959 | $\nu_7$=60.5 |
| $R_{11}$=−41.41 | $a_5$=0.37 | | air | |
| $R_{12}$=+288.32 | $d_8$=7.45 | | $n_8$=1.69347 | $\nu_8$=53.5 |
| $R_{13}$=−61.82 | | | | |

According to the table, $a_1$=1.87
$d_2$=3.44
$d_3$=15.74
$a_2$=0.28
$d_4$=11.79
$a_3$=1.55
$d_5$=3.35
$b_1$=11.45
---
A=49.47, and f=100

Thus, distance A amounts to 49.47% of f, i. e. is distinctly greater than ⅓ f. Furthermore $n_1$=1.61959, i. e. distinctly higher than $n_5$=1.54826.

It will be understood from the above that this invention is not limited to the elements, figures, uses and other details specifically described above and illustrated in the drawings and includes a fundamental, novel structural principle which has numerous modifications, embodiments and applications. By using, according to the invention, a first meniscus-shaped front member of the type described and combining it with two lens pairs of the type shown, following said first member in the half objective located on the side of the major conjugate, fine corrections are considerably facilitated and the performance of the objective, is considerably improved in all embodiments of the invention as defined in the appended claims.

What is claimed is:

1. Modified photographic Gauss-type objective of high light-transmitting capacity and anastigmatic flatness of the image field, comprising two half objectives separated by a centrally arranged diaphragm, a half objective located on the side of the minor conjugate being of the conventional three element Gauss-type, while the half objective located on the side of the major conjugate consists of a meniscus-shaped first front member, which limits the total objective on the outer side of the total objective and is concave relative to the diaphragm, and a first and a second pair of menisci follow said first member in the direction of light, in the space between said first member and the diaphragm, the first pair of menisci consisting of a negative meniscus followed by a positive meniscus, and the second pair of menisci consisting of a positive meniscus followed by a negative meniscus, in the direction of light, all surfaces of the menisci forming said first and second pair, having convex curvature relative to the side of the major conjugate, the distance, along the optical axis, between the centrally arranged diaphragm and the vertex of the rear surface of the first meniscus-shaped lens of the half objective located on the side of the major conjugate, being in the range of $\frac{1}{3}$ and $\frac{5}{3}$ of the equivalent focal length of the total objective.

2. Modified photographic Gauss-type objective of high light-transmitting capacity and anastigmatic flatness of the image field, comprising two half objectives separated by a centrally arranged diaphragm, the half objective located on the side of the minor conjugate being of the conventional three element Gauss-type, while the half objective located on the side of the major conjugate consists of a meniscus-shaped first front member, which limits the total objective on the outer side of the total objective and is concave relative to the diaphragm, and a first and a second pair of menisci follow said first member in the direction of light, in the space between said first member and the diaphragm, the first pair of menisci consisting of a negative meniscus followed by a positive meniscus, and the second pair of menisci consisting of a positive meniscus followed by a negative meniscus, in the direction of light, all surfaces of the menisci forming said first and second pair, having convex curvature relative to the side of the major conjugate, the distance, along the optical axis, between the centrally arranged diaphragm and the vertex of the rear surface of the first meniscus-shaped lens of the half objective located on the side of the major conjugate, being in the range of $\frac{1}{3}$ and $\frac{5}{3}$ of the equivalent focal length of the total objective, and the mean refractive number of said first meniscus-shaped front member of the half objective located on the side of the major conjugate, being distinctly higher than the mean refractive number, for the same color, of the meniscus-shaped individual lens which limits the half objective located on the side of the major conjugate, on the side adjacent the diaphragm.

3. Modified photographic Gauss-type objective of high light-transmitting capacity and anastigmatic flatness of the image field, comprising two half objectives separated by a centrally arranged diaphragm, the half objective located on the side of the minor conjugate being of the conventional three element Gauss-type, while the half objective located on the side of the major conjugate consists of a meniscus-shaped first front member, which limits the total objective on the outer side of the total objective and is concave relative to the diaphragm, and a first and a second pair of menisci follow said first member in the direction of light, in the space between said first member and the diaphragm, the first pair of menisci consisting of a negative meniscus followed by a positive meniscus, and the second pair of menisci consisting of a positive meniscus followed by a negative meniscus, in the direction of light, all surfaces of the menisci forming said first and second pair, having convex curvature relative to the side of the major conjugate, the distance, along the optical axis, between the centrally arranged diaphragm and the vertex of the rear surface of the first meniscus-shaped lens of the half objective located on the side of the major conjugate, being in the range of $\frac{1}{3}$ and $\frac{5}{3}$ of the equivalent focal length of the total objective, and the first meniscus-shaped front member of the half objective located on the side of the major conjugate, being composed of two cemented individual lenses.

ALBRECHT WILHELM TRONNIER.

References Cited in the file of this patent

UNITED STATES PATENTS

| Number | Name | Date |
|---|---|---|
| 2,012,822 | Lee | Aug. 27, 1935 |
| 2,106,077 | Tronnier | Jan. 18, 1938 |
| 2,164,028 | Berek | June 27, 1939 |
| 2,487,750 | Wynne | Nov. 8, 1949 |
| 2,549,159 | Bertele | Apr. 17, 1951 |

FOREIGN PATENTS

| Number | Country | Date |
|---|---|---|
| 428,657 | Germany | May 10, 1926 |
| 665,520 | Germany | Sept. 27, 1938 |
| 229,459 | Switzerland | Feb. 1, 1944 |